United States Patent
Kobayashi

(10) Patent No.: US 12,234,904 B2
(45) Date of Patent: Feb. 25, 2025

(54) VEHICLE COOLING STRUCTURE

(71) Applicant: SUBARU CORPORATION, Tokyo (JP)

(72) Inventor: Nobuaki Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 427 days.

(21) Appl. No.: 17/671,028

(22) Filed: Feb. 14, 2022

(65) Prior Publication Data

US 2022/0275858 A1    Sep. 1, 2022

(30) Foreign Application Priority Data

Feb. 26, 2021    (JP) .................................. 2021-030547

(51) Int. Cl.
| | |
|---|---|
| *F16H 57/04* | (2010.01) |
| *B60K 1/00* | (2006.01) |
| *B60L 53/20* | (2019.01) |
| *F16H 57/037* | (2012.01) |
| *H02M 7/00* | (2006.01) |
| *H02P 27/06* | (2006.01) |

(52) U.S. Cl.
CPC .......... *F16H 57/0412* (2013.01); *B60K 1/00* (2013.01); *B60L 53/20* (2019.02); *F16H 57/037* (2013.01); *F16H 57/0467* (2013.01); *H02M 7/003* (2013.01); *B60K 2001/001* (2013.01); *H02P 27/06* (2013.01)

(58) Field of Classification Search
None
See application file for complete search history.

(56) References Cited

U.S. PATENT DOCUMENTS

| | | | |
|---|---|---|---|
| 6,166,498 A | 12/2000 | Yamaguchi et al. | |
| 11,613,173 B2* | 3/2023 | Kobayashi ............. | B60K 11/02 310/57 |
| 11,938,806 B2* | 3/2024 | Finger-Albert ........ | B60K 11/02 |
| 2005/0211490 A1 | 9/2005 | Shimizu et al. | |

(Continued)

FOREIGN PATENT DOCUMENTS

| | | | | |
|---|---|---|---|---|
| CN | 103636298 A | | 3/2014 | |
| DE | 102014100291 A1 * | | 8/2014 | ............. B60K 6/405 |

(Continued)

OTHER PUBLICATIONS

Translation of DE-102017220444-A1 (Year: 2017).*

(Continued)

*Primary Examiner* — Katy M Ebner
(74) *Attorney, Agent, or Firm* — MCGINN I.P. LAW GROUP, PLLC

(57) ABSTRACT

A vehicle cooling structure to be applied to a vehicle includes a gear case, an inverter, a step-down converter, and a cooling passage. The gear case is to house a gear mechanism and oil of the vehicle. The inverter is disposed on an outer surface of the gear case and to be electrically coupled to a motor of the vehicle. The step-down converter is disposed on the outer surface of the gear case and electrically coupled to the inverter. The cooling passage is formed between an inner surface of the gear case and the inverter, and between the inner surface and the step-down converter. The cooling passage is configured such that coolant flows therethrough.

20 Claims, 5 Drawing Sheets

(56) References Cited

U.S. PATENT DOCUMENTS

| | | | |
|---|---|---|---|
| 2010/0013331 A1 | 1/2010 | Yoshida et al. | |
| 2014/0125164 A1 | 5/2014 | Mukunoki et al. | |
| 2018/0130592 A1* | 5/2018 | Yonak | H01F 27/22 |
| 2020/0166116 A1* | 5/2020 | Jang | F16H 57/0412 |
| 2021/0086608 A1* | 3/2021 | Finger-Albert | H02K 11/33 |

FOREIGN PATENT DOCUMENTS

| | | | | |
|---|---|---|---|---|
| DE | 102017220444 A1 * | 5/2019 | | |
| DE | 102020215219 A1 * | 6/2021 | | B60K 17/06 |
| JP | 2000-217205 A | 8/2000 | | |
| JP | 2005-253167 A | 9/2005 | | |
| JP | 2008-105645 A | 5/2008 | | |
| JP | 2012-159173 A | 8/2012 | | |
| JP | 2013-256983 A | 12/2013 | | |
| JP | 2015-020634 A | 2/2015 | | |
| JP | 2016-152637 A | 8/2016 | | |
| JP | 2016-208720 A | 12/2016 | | |
| JP | 2020-089170 A | 6/2020 | | |
| WO | WO-2021254707 A1 * | 12/2021 | | H02K 11/33 |

OTHER PUBLICATIONS

Japanese Office Action, date Oct. 29, 2024 in Japanese Application No. 2021-030547 and English Translation thereof.
Japanese Office Action, date Apr. 2, 2024 in Japanese Application No. 2020-159330 and English Translation thereof.

\* cited by examiner

VEHICLE COOLING STRUCTURE

CROSS-REFERENCE TO RELATED APPLICATIONS

The present application claims priority from Japanese Patent Application No. 2021-030547 filed on Feb. 26, 2021, the entire contents of which are hereby incorporated by reference.

BACKGROUND

The disclosure relates to a vehicle cooling structure.

In a vehicle, a power conversion apparatus such as an inverter is used in order to implement power supply to a motor. In order to maintain a performance of the power conversion apparatus, it is necessary to cool the power conversion apparatus. For example, Japanese Unexamined Patent Application Publication (JP-A) No. 2008-105645 discloses a technique for cooling an inverter by circulating a refrigerant.

SUMMARY

An aspect of the disclosure provides a vehicle cooling structure to be applied to a vehicle. The vehicle cooling structure includes a gear case, an inverter, a step-down converter, and a cooling passage. The gear case is to house a gear mechanism and oil of the vehicle. The inverter is disposed on an outer surface of the gear case and to be electrically coupled to a motor of the vehicle. The step-down converter is disposed on the outer surface of the gear case and electrically coupled to the inverter. The cooling passage is formed between an inner surface of the gear case and the inverter, and between the inner surface and the step-down converter. The cooling passage is configured such that coolant flows therethrough.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

A vehicle is provided with a gear mechanism such as a rear differential gear. The gear mechanism is air-cooled by, for example, fins disposed in a gear case that houses the gear mechanism. In a vehicle in the related art, a cooling structure for a power conversion apparatus such as an inverter and a cooling structure for a gear mechanism are provided separately (that is, for respective cooling targets). Therefore, spaces occupied by the cooling structures are increased, and as a result, it is not easy to improve a degree of freedom of vehicle design.

Accordingly, it is desirable to provide a simplified vehicle cooling structure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
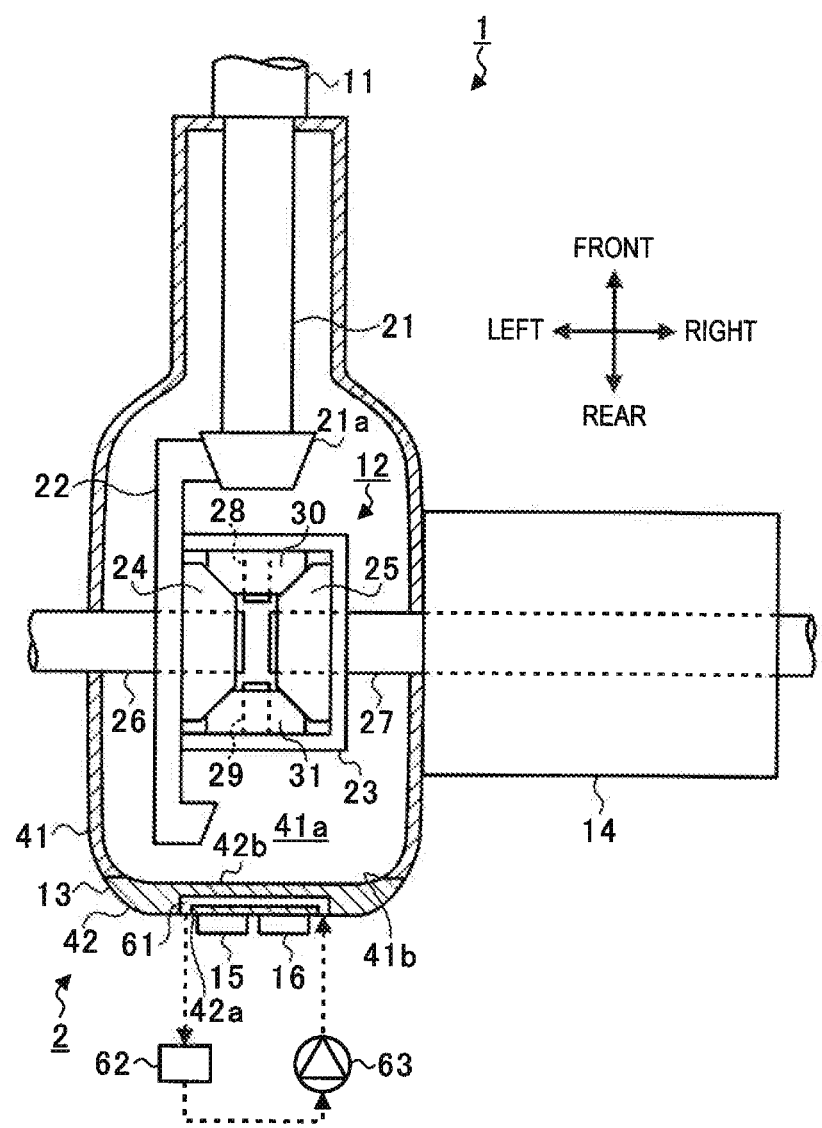
FIG. 1 is a schematic diagram illustrating a configuration of a vehicle according to an embodiment of the disclosure.
Figure 2:
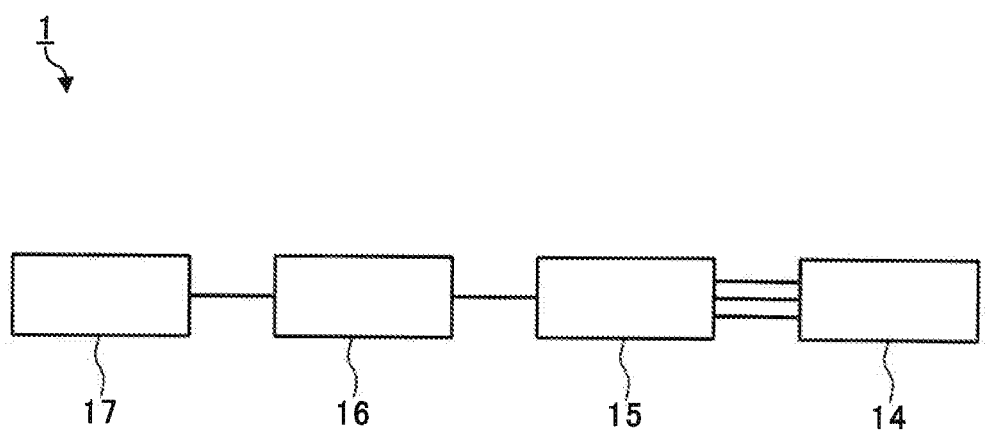
FIG. 2 is a schematic diagram illustrating a power supply system of the vehicle according to the embodiment.

FIG. 1 is a schematic diagram illustrating a part of a vehicle 1 according to the present embodiment. A vehicle cooling structure 2 is applied to the vehicle 1. In FIG. 1, front-rear and left-right directions of the vehicle 1 are indicated by solid arrows. FIG. 2 is a schematic diagram illustrating a power supply system of the vehicle 1 according to the present embodiment.

The vehicle 1 is, for example, an engine vehicle provided with an engine as a drive source for traveling. The vehicle 1 may be an electric vehicle provided with a motor as the drive source for traveling, or may be a hybrid vehicle provided with an engine and a motor as driving sources.

As illustrated in FIG. 1, the vehicle 1 includes a propeller shaft 11, a rear differential gear 12, a gear case 13, a motor 14, an inverter 15, and a step-down converter 16. One end of the propeller shaft 11 is coupled to the drive source for traveling (for example, the engine) through a transmission. The rear differential gear 12 corresponds to an example of a gear mechanism according to the disclosure. Further, as illustrated in FIG. 2, the power supply system of the vehicle 1 includes a battery 17 in addition to the motor 14, the inverter 15, and the step-down converter 16.

The rear differential gear 12 includes an input shaft 21, a ring gear 22, a frame 23, a first side gear 24, a second side gear 25, a first output shaft 26, a second output shaft 27, a first pinion shaft 28, a second pinion shaft 29, a first pinion gear 30, and a second pinion gear 31.

In one example, the input shaft 21 is a drive pinion shaft. The other end of the propeller shaft 11 is coupled to the input shaft 21. The input shaft 21 extends in the front-rear direction. A bevel gear 21a is formed at a tip of the input shaft 21. The bevel gear 21a meshes with the ring gear 22. The frame 23 protrudes from one side surface of the ring gear 22. The frame 23 is hollow. The frame 23 rotates permanently affixed with the ring gear 22.

The first side gear 24, the second side gear 25, the first pinion gear 30, and the second pinion gear 31 are housed in the frame 23. The first side gear 24 and the second side gear 25 are disposed parallel to the ring gear 22, and face each other with a gap therebetween. The first side gear 24 is coupled to the first output shaft 26. The first output shaft 26 extends leftward through the ring gear 22 and is coupled to a left rear wheel. The second side gear 25 is coupled to the second output shaft 27. The second output shaft 27 extends rightward through the frame 23 and is coupled to a right rear wheel.

Each of the first pinion shaft 28 and the second pinion shaft 29 protrudes from an inner surface of the frame 23. The first pinion gear 30 is rotatably supported by the frame 23 via the first pinion shaft 28. The second pinion gear 31 is rotatably supported by the frame 23 via the second pinion shaft 29. The first pinion gear 30 and the second pinion gear 31 mesh with the first side gear 24 and the second side gear 25, respectively.

The gear case 13 is configured with a case main body 41 and a cover 42. A space 41a is formed inside the case main body 41. An opening 41b is provided on a rear side of the case main body 41. The cover 42 closes the opening 41b of the case main body 41 from the rear side. When the cover 42 is attached to the case main body 41, the gear case 13 is sealed. The gear case 13 is sealed while housing the rear differential gear 12 and oil. The oil lubricates the components of the rear differential gear 12.

In the rear differential gear 12, frictional heat is generated between the gears in accordance with rotation of the gears. For example, relatively large frictional heat is generated between the bevel gear 21a of the input shaft 21 and the ring gear 22. The oil in the gear case 13 is heated by such frictional heat.

The motor 14 outputs power for assisting rotation of the rear wheels. The motor 14 is, for example, a three-phase AC motor. The motor 14 is arranged side by side with the gear case 13, and is coupled to the rear differential gear 12. Although not illustrated, the motor 14 is coupled to, for example, the ring gear 22 or the frame 23.

The inverter 15 is disposed on an outer surface 42a of the cover 42 of the gear case 13. As illustrated in FIG. 2, the inverter 15 is electrically coupled to the motor 14 through a power line. The step-down converter 16 is disposed on the outer surface 42a of the cover 42 of the gear case 13. As illustrated in FIG. 2, the step-down converter 16 is electrically coupled to the inverter 15 through the power line. The battery 17 (for example, a secondary battery such as a lithium ion battery or a nickel hydrogen battery) is electrically coupled to the step-down converter 16 through the power line. Although simplified in FIG. 2 for ease of understanding, various devices (for example, various inverters for devices other than the motor 14; not illustrated) may be further coupled to the battery 17.

The step-down converter 16 steps down power stored in the battery 17 (that is, lowers a voltage) and supplies the stepped-down power to the inverter 15. The inverter 15 converts supplied DC power into AC power and supplies the AC power to the motor 14. In this way, the power is supplied from the battery 17 to the motor 14 via the power conversion apparatus including the inverter 15 and the step-down converter 16. The motor 14 is driven by the power supplied from the battery 17. The inverter 15 and the step-down converter 16 generate heat in response to supply of a current to the motor 14.

The vehicle cooling structure 2 includes a cooling passage 61 formed inside the cover 42 of the gear case 13. The cooling passage 61 is formed between an inner surface 42b of the cover 42 of the gear case 13 (that is, an inner surface of the gear case 13) and the inverter 15, and between the inner surface 42b and the step-down converter 16. That is, the cooling passage 61 is formed in a portion of the gear case 13 where the inverter 15 and the step-down converter 16 are disposed. A coolant flows through the cooling passage 61. As will be described in detail later, the coolant flowing through the cooling passage 61 cools both the oil in the gear case 13 and the power conversion apparatus (that is, the inverter 15 and the step-down converter 16), which are cooling targets of the vehicle cooling structure 2.

The vehicle 1 is provided with a heat exchanger 62 and a cooling pump 63. Positions of the heat exchanger 62 and the cooling pump 63 are not limited to the rear side of the gear case 13, and may be a front side of the gear case 13. As indicated by dashed arrows in FIG. 1, the cooling passage 61, the heat exchanger 62, and the cooling pump 63 form a cooling circuit through which the coolant circulates. The heat exchanger 62 cools the coolant delivered from the cooling passage 61 of the gear case 13. The cooling pump 63 feeds the coolant cooled by the heat exchanger 62 to the cooling passage 61 of the gear case 13.

Figure 3:
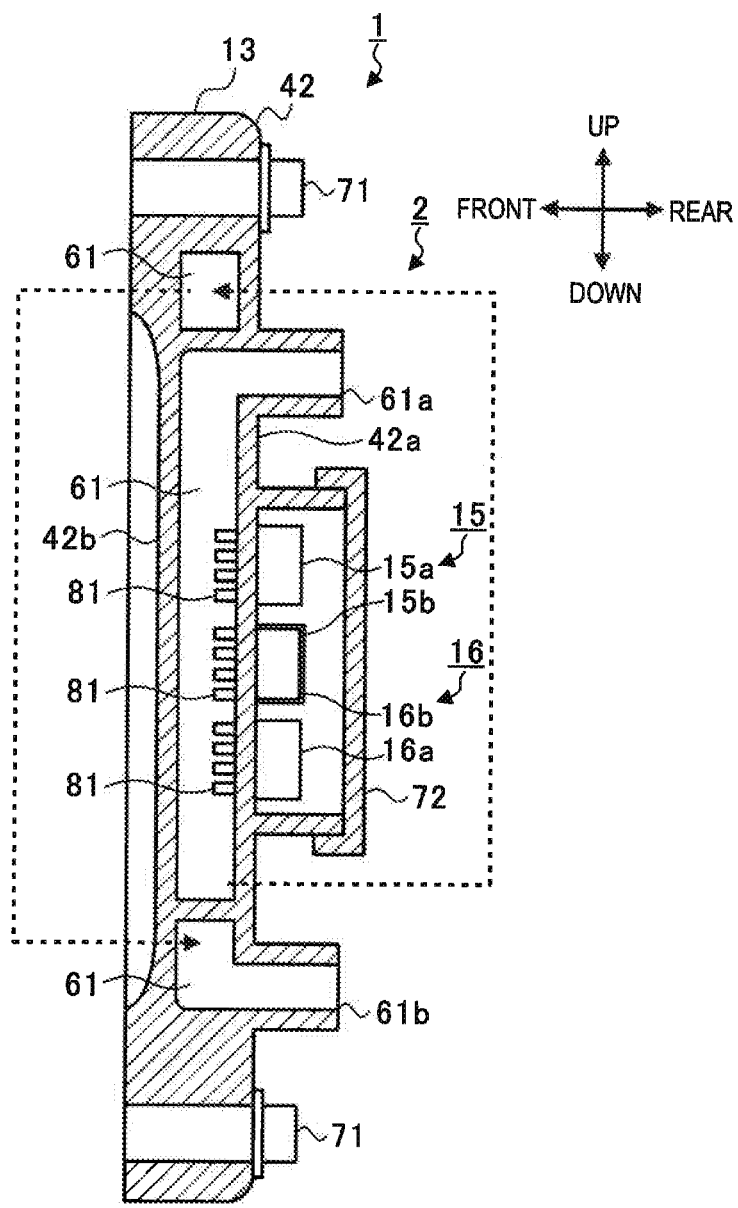
FIG. 3 is a schematic cross-sectional view of a cover according to the embodiment.

FIG. 3 is a schematic cross-sectional view of the cover 42. In FIG. 3, up-down and front-rear directions of the vehicle 1 are indicated by solid arrows. In addition, dashed arrows in FIG. 3 indicate that the cooling passage 61 is connected. As illustrated in FIG. 3, the cover 42 is attached to the case main body 41 by fastening members 71 such as bolts.

The inverter 15 includes a capacitor 15a and a power module 15b. The power module 15b includes a plurality of semiconductor switching elements such as insulated gate bipolar transistors (IGBTs). For example, in the power module 15b, six semiconductor switching elements are coupled in a three-phase bridge between DC terminals coupled to the step-down converter 16. The capacitor 15a is, for example, an electrolytic capacitor. The capacitor 15a is, for example, coupled in parallel between the DC terminals of the power module 15b. The capacitor 15a and the power module 15b generate heat when a current is supplied to the motor 14.

The step-down converter 16 includes a reactor 16a and a power module 16b. The step-down converter 16 includes, for example, a chopper circuit. The reactor 16a is coupled in series to a DC terminal coupled to the battery 17 in the chopper circuit. The power module 16b is a portion including semiconductor switching elements such as IGBTs in the chopper circuit. The reactor 16a and the power module 16b generate heat when a current is supplied to the motor 14.

The inverter 15 (specifically, the capacitor 15a and the power module 15b) and the step-down converter 16 (specifically, the reactor 16a and the power module 16b) are fixed to the outer surface 42a of the cover 42. The inverter 15 and the step-down converter 16 are fixed such that heat dissipation surfaces thereof are in contact with the cover 42. Electrical terminals of the inverter 15 and the step-down converter 16 are disposed, for example, on surfaces different from the surfaces in contact with the cover 42, such as side surfaces thereof. Further, the inverter 15 and the step-down converter 16 are surrounded and covered by a protector 72. The inverter 15 and the step-down converter 16 are sealed by the cover 42 and the protector 72.

The outer surface 42a of the cover 42 is formed with a feed inlet 61a and a feed outlet 61b that are open rearward. The cooling passage 61 communicates from the feed inlet 61a to the feed outlet 61b. The feed inlet 61a is coupled to the cooling pump 63 through a pipe or the like. The feed outlet 61b is coupled to the heat exchanger 62 through a pipe or the like.

As described above, the cooling passage 61 is formed between the inner surface 42b of the cover 42 and the inverter 15, and between the inner surface 42b and the step-down converter 16. In one example, the cooling passage 61 is formed so as to pass between the inner surface 42b of the cover 42 and the capacitor 15a, between the inner surface 42b of the cover 42 and the power module 15b, between the inner surface 42b of the cover 42 and the power module 16b, and between the inner surface 42b of the cover 42 and the reactor 16a.

The oil in the gear case 13 is in contact with the inner surface 42b of the cover 42. Therefore, the oil in the gear case 13 is cooled by heat exchange with the coolant in the cooling passage 61 through the inner surface 42b of the cover 42. The capacitor 15a and the power module 15b are in contact with the outer surface 42a of the cover 42. Therefore, the capacitor 15a and the power module 15b are cooled by the heat exchange with the coolant in the cooling passage 61 through the outer surface 42a of the cover 42. Further, the reactor 16a and the power module 16b are in contact with the outer surface 42a of the cover 42. Therefore, the reactor 16a and the power module 16b are cooled by the heat exchange with the coolant in the cooling passage 61 through the outer surface 42a of the cover 42.

In this way, in the vehicle cooling structure 2, both the oil in the gear case 13 and the power conversion apparatus (that is, the inverter 15 and the step-down converter 16) can be cooled by the common coolant flowing through the cooling passage 61. Accordingly, for example, in the vehicle cooling structure 2, air cooling fins of the gear case 13 can be omitted. Therefore, in the vehicle cooling structure 2, it is possible to reduce the increase in the space occupied by the cooling structure.

Therefore, according to the vehicle cooling structure 2 of the present embodiment, the cooling structure can be simplified, and the degree of freedom of the vehicle design can be improved.

A heat-resistant temperature of the oil in the gear case 13 exceeds, for example, 100° C. Meanwhile, heat-resistant temperatures of the capacitor 15a, the power module 15b, the reactor 16a, and the power module 16b are less than 100° C., for example, about 80° C. In some cases, a temperature of the oil in the gear case 13 may be higher than the heat-resistant temperatures of the capacitor 15a, the power module 15b, the reactor 16a, and the power module 16b.

However, in the vehicle cooling structure 2, the coolant flows between the oil in the gear case 13 and each one among the capacitor 15a, the power module 15b, the reactor 16a, and the power module 16b. Accordingly, in the vehicle cooling structure 2, the coolant prevents heat of the oil in the gear case 13 from being transmitted to the capacitor 15a, the power module 15b, the reactor 16a, and the power module 16b.

Therefore, in the vehicle cooling structure 2, even when the temperature of the oil in the gear case 13 is equal to or higher than the heat resistant temperatures of the capacitor 15a, the power module 15b, the reactor 16a, and the power module 16b, temperatures of the capacitor 15a, the power module 15b, the reactor 16a, and the power module 16b can be made lower than the heat-resistant temperatures of the capacitor 15a, the power module 15b, the reactor 16a, and the power module 16b. As a result, in the vehicle cooling structure 2, even though the inverter 15 and the step-down converter 16 are disposed on the outer surface 42a of the gear case 13, the inverter 15 and the step-down converter 16 can be prevented from being damaged.

Further, the cooling passage 61 communicates in an up-down direction in the vicinity of the inverter 15 and the step-down converter 16. Accordingly, for example, even when a small amount of air is mixed into the coolant, the air is moved upward. Therefore, in the vehicle cooling structure 2, it is possible to prevent the air in the coolant from staying in the vicinity of the inverter 15 and the step-down converter 16, and it is possible to prevent a reduction in a cooling effect of the inverter 15 and the step-down converter 16.

As illustrated in FIG. 3, the gear case 13 includes a plurality of fins 81 protruding from an inner surface of the cooling passage 61 into the cooling passage 61. The fins 81 are formed in a region of the inner surface of the cooling passage 61 on a side opposite to a region where the inverter 15 and the step-down converter 16 are in contact with the gear case 13. That is, the fins 81 are disposed at positions corresponding to installation positions of the inverter 15 and the step-down converter 16 (specifically, positions facing the inverter 15 and the step-down converter 16) in the cooling passage 61.

In one example, the fins 81 are formed in a region of the inner surface of the cooling passage 61 on a side opposite to a region where the capacitor 15a is in contact with the gear case 13. The fins 81 are formed in a region of the inner surface of the cooling passage 61 on a side opposite to a region where the power module 15b is in contact with the gear case 13. The fins 81 are formed in a region of the inner surface of the cooling passage 61 on a side opposite to a region where the reactor 16a is in contact with the gear case 13. Further, the fins 81 are formed in a region of the inner surface of the cooling passage 61 on a side opposite to a region where the power module 16b is in contact with the gear case 13. Each fin 81 is formed in, for example, a prismatic shape extending from the inner surface of the cooling passage 61. A shape of the fin 81 is not limited to the prismatic shape, and may be appropriately designed, such as a pyramidal shape.

In the vehicle cooling structure 2, since the fins 81 are formed at positions close to the inverter 15 and the step-down converter 16, an area of the heat exchange between the coolant flowing through the cooling passage 61 and the inverter 15 and the step-down converter 16 is widened. Therefore, in the vehicle cooling structure 2, the cooling effect of the inverter 15 and the step-down converter 16 can be improved.

Further, the vehicle 1 can perform mechanical four-wheel drive using the propeller shaft 11. In such a mechanical four-wheel drive vehicle, the rear differential gear 12 may vibrate due to a phase difference in power transmission between front wheels and rear wheels. Therefore, in the mechanical four-wheel drive vehicle, an inertial mass, that is, a ballast is provided at a position on a rear side of the gear case 13 of the rear differential gear 12.

In the vehicle 1, as described above, the inverter 15 and the step-down converter 16 are located on a rear side of the vehicle 1 in the gear case 13. The inverter 15 and the step-down converter 16 have a considerable mass. Accordingly, the inverter 15 and the step-down converter 16 can function as at least a part of the inertial mass described above. Therefore, in the vehicle 1, a mass of the inertia mass to be added can be reduced by the mass of the inverter 15 and the step-down converter 16. As a result, in the vehicle 1 to which the vehicle cooling structure 2 is applied, an increase in a total weight of the vehicle 1 can be reduced.

Figure 4:
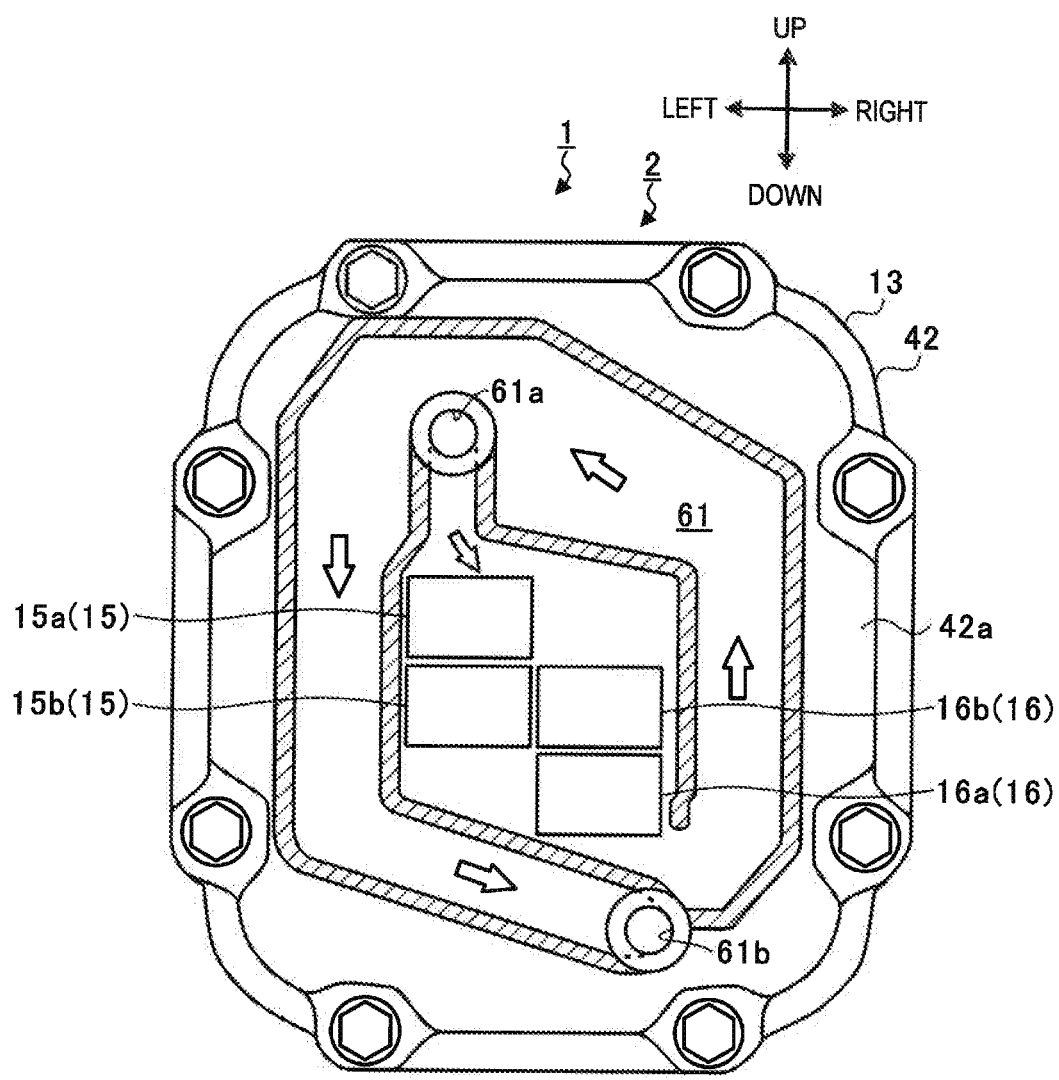
FIG. 4 is a transparent plan view of the cover according to the embodiment as viewed from a rear.

FIG. 4 is a transparent plan view of the cover 42 as viewed from the rear side. In FIG. 4, the up-down and left-right directions of the vehicle 1 are indicated by solid arrows. Further, white arrows in FIG. 4 illustrate a direction in which the coolant flows.

The capacitor 15a and the power module 15b of the inverter 15, and the reactor 16a and the power module 16b of the step-down converter 16 are disposed in the vicinity of a center of the outer surface 42a of the cover 42. The feed inlet 61a is located above the capacitor 15a, the power module 15*b*, the reactor 16*a*, and the power module 16*b*. The feed outlet 61*b* is located below the capacitor 15*a*, the power module 15*b*, the reactor 16*a*, and the power module 16*b*.

As illustrated in FIG. 4, the cooling passage 61 is spirally spread from an inner portion close to the center of the outer surface 42*a* toward an outer portion far from the center. The feed inlet 61*a* is located at an inner end of the spiral of the cooling passage 61. The feed outlet 61*b* is located at an outer end of the spiral of the cooling passage 61. The capacitor 15*a*, the power module 15*b*, the reactor 16*a*, and the power module 16*b* are located in the vicinity of the feed inlet 61*a* in a path of the cooling passage 61.

The capacitor 15*a* is disposed above the power module 15*b*. That is, the capacitor 15*a* is disposed upstream of the power module 15*b* on the cooling passage 61. The reactor 16*a* is disposed below the power module 16*b*. That is, the reactor 16*a* is disposed downstream of the power module 16*b* on the cooling passage 61. The power module 15*b* of the inverter 15 and the power module 16*b* of the step-down converter 16 are arranged in the left-right direction. That is, a position of the power module 15*b* in the up-down direction and a position of the power module 16*b* in the up-down direction substantially coincide with each other.

The coolant fed from the feed inlet 61*a* passes through the vicinity of the capacitor 15*a*, the vicinity of the power module 15*b* and the power module 16*b*, and the vicinity of the reactor 16*a* in this order. The capacitor 15*a*, the power module 15*b*, the reactor 16*a*, and the power module 16*b* are cooled by a coolant having a sufficiently high cooling capacity, in other words, a coolant having a sufficiently low temperature. Therefore, in the vehicle cooling structure 2, the inverter 15 and the step-down converter 16 can be effectively cooled.

Here, in the inverter 15, a heat resistance performance of the capacitor 15*a* is lower than a heat resistance performance of the power module 15*b*. Therefore, by placing the capacitor 15*a* upstream of the power module 15*b* on the cooling passage 61, the capacitor 15*a* can be cooled preferentially to the power module 15*b*. Further, in the step-down converter 16, a heat resistance performance of the power module 16*b* is lower than a heat resistance performance of the reactor 16*a*. Therefore, by placing the reactor 16*a* downstream of the power module 16*b* on the cooling passage 61, the power module 16*b* can be cooled preferentially to the reactor 16*a*.

The coolant passing through the vicinity of the reactor 16*a* circulates in the vicinity of a peripheral edge of the cover 42 and reaches the feed outlet 61*b*. Accordingly, the coolant cools a wide range of the inner surface 42*b* and the outer surface 42*a* of the cover 42. Therefore, the oil in contact with the inner surface 42*b* of the cover 42 can be effectively cooled. As described above, the capacitor 15*a*, the power module 15*b*, the reactor 16*a*, and the power module 16*b* may have temperatures lower than that of the oil. Therefore, the coolant after the heat exchange with the capacitor 15*a*, the power module 15*b*, the reactor 16*a*, and the power module 16*b* can sufficiently cool the oil.

As described above, an example of a positional relationship between the components including the capacitor 15*a*, the power module 15*b*, the reactor 16*a*, and the power module 16*b* has been described with reference to FIG. 4, whereas the positional relationship between the components is not limited to the example of FIG. 4. For example, the positional relationship between the components in the up-down direction may be different from that in the example of FIG. 4.

Figure 5:
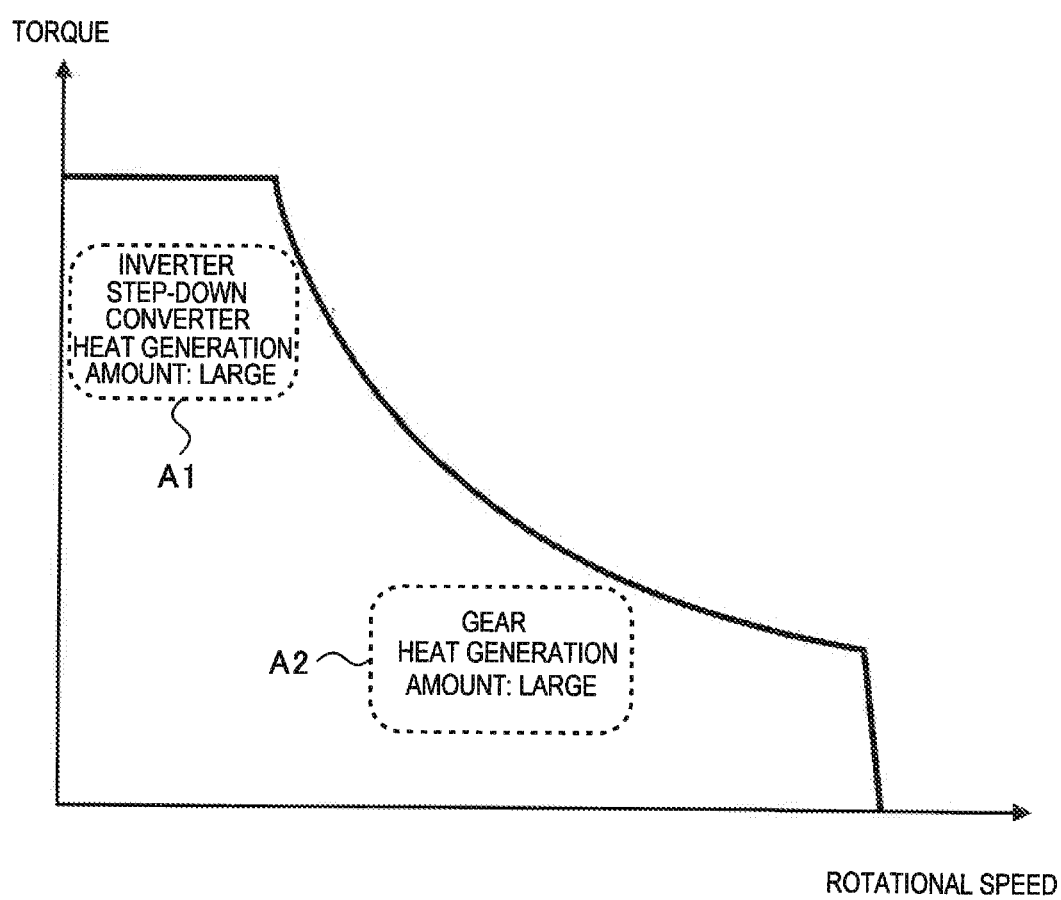
FIG. 5 is a diagram illustrating an example of an output characteristic of a motor according to the embodiment.

FIG. 5 is a diagram illustrating an example of an output characteristic of the motor 14. As illustrated in FIG. 5, a torque of the motor 14 increases as a rotational speed decreases, and decreases as the rotational speed increases.

The current supplied from the inverter 15 to the motor 14 increases as the torque of the motor 14 increases. Therefore, as illustrated by a broken line A1 in FIG. 5, an amount of the heat generated by the inverter 15 and the step-down converter 16 increases as the torque of the motor 14 increases.

In contrast, a rotational speed of each gear of the rear differential gear 12 increases as the rotational speed of the motor 14 increases. As the rotational speed of each gear increases, an amount of the heat generated by the friction between the gears increases. That is, as illustrated by a broken line A2 in FIG. 5, an amount of the heat generated by the rear differential gear 12 increases as the rotational speed of the motor 14 increases.

In this way, the inverter 15 supplies the current to the motor 14 such that a timing at which the amount of the heat generated by the inverter 15 and the step-down converter 16 increases is different from a timing at which the amount of the heat generated by the rear differential gear 12 increases.

Accordingly, in the vehicle cooling structure 2, the cooling of the inverter 15 and the step-down converter 16 may be reduced when the cooling of the oil in the gear case 13 is significantly necessary, and the cooling of the oil in the gear case 13 may be reduced when the cooling of the inverter 15 and the step-down converter 16 is significantly necessary. Therefore, in the vehicle cooling structure 2, it is possible to cool the oil in the gear case 13 and the power conversion apparatus (that is, the inverter 15 and the step-down converter 16) while reducing an increase in a size of the heat exchanger 62 or the cooling pump 63.

Here, in the vehicle cooling structure 2, since the step-down converter 16 is provided in addition to the inverter 15 as the power conversion apparatus, the following various effects are achieved.

For example, since the voltage of the inverter 15 can be lowered by the step-down converter 16, a switching loss in the inverter 15 can be reduced. As a result, the increase in the size of the inverter 15 can be reduced.

Further, for example, since a voltage of the battery 17 can be lowered by the step-down converter 16 and the power can be supplied to the motor 14, it is possible to flexibly cope with a case where the voltage of the battery 17 is to be changed at a time of designing the vehicle 1 without reselecting each component. That is, flexibility with respect to system changes is enhanced.

Further, for example, since a voltage of the motor 14 can be adjusted by the step-down converter 16, even when an induced voltage generated in the motor 14 increases as the rotational speed of the motor 14 increases, it is possible to prevent the induced voltage from exceeding the voltage of the battery 17. Accordingly, it is not necessary to set the voltage of the inverter 15 to be excessively high in advance such that the induced voltage does not exceed the voltage of the battery 17 regardless of the rotational speed of the motor 14. Therefore, an increase in the switching loss due to the increase in the voltage in the inverter 15 can be reduced, and the increase in the size of the inverter 15 can be reduced.

For example, by providing the step-down converter 16, it is possible to reduce the switching loss in the inverter 15 as described above without lowering a carrier frequency. Therefore, deterioration of responsiveness of control of the motor 14 due to the decrease of the carrier frequency can be reduced, and deterioration of responsiveness of the torque can be reduced.

As described above, according to the vehicle cooling structure 2 of the present embodiment, it is possible to simplify the cooling structure while benefiting from the various effects described above due to the provision of the step-down converter 16.

Although the embodiment of the disclosure has been described above with reference to the accompanying drawings, it is not necessary to say that the disclosure is not limited to such an embodiment. It will be apparent to those skilled in the art that various changes and modifications may be conceived within the scope of the claims, and it is understood that such changes and modifications also fall within the technical scope of the disclosure.

For example, the inverter 15 and the step-down converter 16 in the above-described embodiment are disposed on the outer surface 42a of the cover 42. However, the inverter 15 and the step-down converter 16 may be disposed on an outer surface of the case main body 41 without being limited to the outer surface of the cover 42.

Further, the inverter 15 and the step-down converter 16 in the above-described embodiment are disposed on the rear side of the gear case 13. However, positions of the inverter 15 and the step-down converter 16 may be disposed at any positions in the gear case 13 without being limited to the rear side of the gear case 13. Here, when the inverter 15 and the step-down converter 16 are caused to function as a part of the inertia mass, the inverter 15 and the step-down converter 16 are disposed on the rear side of the gear case 13.

In the vehicle cooling structure 2 of the above-described embodiment, the fins 81 are provided in the cooling passage 61. However, the fins 81 may be omitted. Here, the cooling effect of the inverter 15 and the step-down converter 16 can be increased by providing the fins 81.

In the above-described embodiment, the gear case 13 that houses the rear differential gear 12 is provided with the inverter 15, the step-down converter 16, and the cooling passage 61. However, the gear case 13 provided with the inverter 15, the step-down converter 16, and the cooling passage 61 is not limited to one that houses the rear differential gear 12. The gear case 13 may house various gear mechanisms such as a front differential gear, a transmission, and a decelerator. Further, oil that lubricates operations of the gear mechanisms is also housed in the gear case 13 that houses these gear mechanisms. In the vehicle cooling structure 2 of this aspect, the oil in the gear case 13 and the power conversion apparatus (that is, the inverter 15 and the step-down converter 16) can be cooled by the common coolant, as in the above-described embodiment.

The invention claimed is:

1. A vehicle cooling structure to be applied to a vehicle, the vehicle cooling structure comprising:
    a gear case to house a gear mechanism and oil of the vehicle, the oil being in contact with an inner surface of the gear case;
    an inverter disposed on an outer surface of the gear case and to be electrically coupled to a motor of the vehicle;
    a step-down converter disposed on the outer surface of the gear case and electrically coupled to the inverter; and
    a cooling passage that is formed between the inner surface of the gear case and the inverter, and between the inner surface and the step-down converter, the cooling passage being configured such that coolant flows therethrough.

2. The vehicle cooling structure according to claim 1, wherein the gear mechanism is a rear differential gear to be coupled to a propeller shaft of the vehicle, and
    wherein the inverter and the step-down converter are to be disposed on a rear side of the vehicle in the gear case.

3. The vehicle cooling structure according to claim 1, further comprising:
    a fin protruding from an inner surface of the cooling passage into the cooling passage, in a first region that is, in the inner surface of the cooling passage, on a side opposite to a second region where the inverter and the step-down converter are in contact with the gear case.

4. The vehicle cooling structure according to claim 2, further comprising:
    a fin protruding from an inner surface of the cooling passage into the cooling passage, in a first region that is, in the inner surface of the cooling passage, on a side opposite to a second region where the inverter and the step-down converter are in contact with the gear case.

5. The vehicle cooling structure according to claim 1, wherein the inverter comprises a capacitor and a power module, and
    wherein the capacitor is disposed upstream of the power module of the inverter on the cooling passage.

6. The vehicle cooling structure according to claim 2, wherein the inverter comprises a capacitor and a power module, and
    wherein the capacitor is disposed upstream of the power module of the inverter on the cooling passage.

7. The vehicle cooling structure according to claim 3, wherein the inverter comprises a capacitor and a power module, and
    wherein the capacitor is disposed upstream of the power module of the inverter on the cooling passage.

8. The vehicle cooling structure according to claim 4, wherein the inverter comprises a capacitor and a power module, and
    wherein the capacitor is disposed upstream of the power module of the inverter on the cooling passage.

9. The vehicle cooling structure according to claim 1, wherein the step-down converter comprises a reactor and a power module, and
    wherein the reactor is disposed downstream of the power module of the step-down converter on the cooling passage.

10. The vehicle cooling structure according to claim 2, wherein the step-down converter comprises a reactor and a power module, and
    wherein the reactor is disposed downstream of the power module of the step-down converter on the cooling passage.

11. The vehicle cooling structure according to claim 3, wherein the step-down converter comprises a reactor and a power module, and
    wherein the reactor is disposed downstream of the power module of the step-down converter on the cooling passage.

12. The vehicle cooling structure according to claim 4, wherein the step-down converter comprises a reactor and a power module, and
    wherein the reactor is disposed downstream of the power module of the step-down converter on the cooling passage.

13. The vehicle cooling structure according to claim 5, wherein the step-down converter comprises a reactor and a power module, and
    wherein the reactor is disposed downstream of the power module of the step-down converter on the cooling passage.

14. The vehicle cooling structure according to claim 6, wherein the step-down converter comprises a reactor and a power module, and wherein the reactor is disposed downstream of the power module of the step-down converter on the cooling passage.

15. The vehicle cooling structure according to claim 7, wherein the step-down converter comprises a reactor and a power module, and
wherein the reactor is disposed downstream of the power module of the step-down converter on the cooling passage.

16. The vehicle cooling structure according to claim 8, wherein the step-down converter comprises a reactor and a power module, and
wherein the reactor is disposed downstream of the power module of the step-down converter on the cooling passage.

17. The vehicle cooling structure according to claim 1, wherein the cooling passage is formed into the gear case.

18. The vehicle cooling structure according to claim 17, wherein the motor of the vehicle is arranged outside of the gear case.

19. The vehicle cooling structure according to claim 1, wherein the gear case includes:
   a case main body having an opening on a rear side of the case main body; and
   a cover that closes and seals the opening of the case main body from the rear side.

20. The vehicle cooling structure according to claim 19, wherein the cooling passage is formed into the cover of the gear case between the inner surface of the cover of the gear case and an outer surface of the cover of the gear case.

* * * * *